March 25, 1958 L. R. BELL ET AL 2,827,797
BICYCLE DRIVE
Filed July 22, 1954 3 Sheets-Sheet 1

INVENTORS
LEO R. BELL
ROBERT L. HOLLOWAY
BY
ATTORNEY

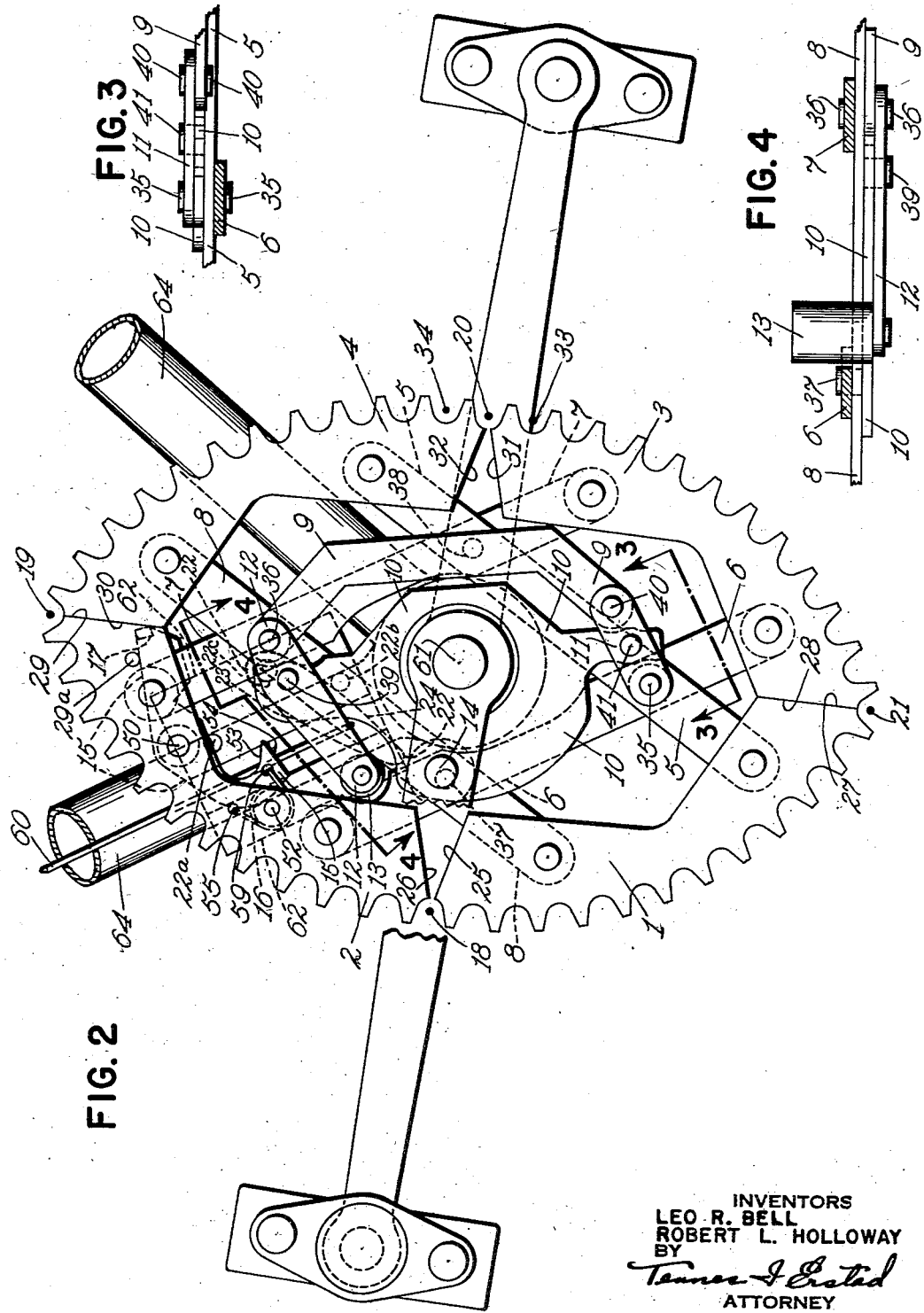

March 25, 1958
L. R. BELL ET AL
2,827,797
BICYCLE DRIVE
Filed July 22, 1954
3 Sheets-Sheet 3
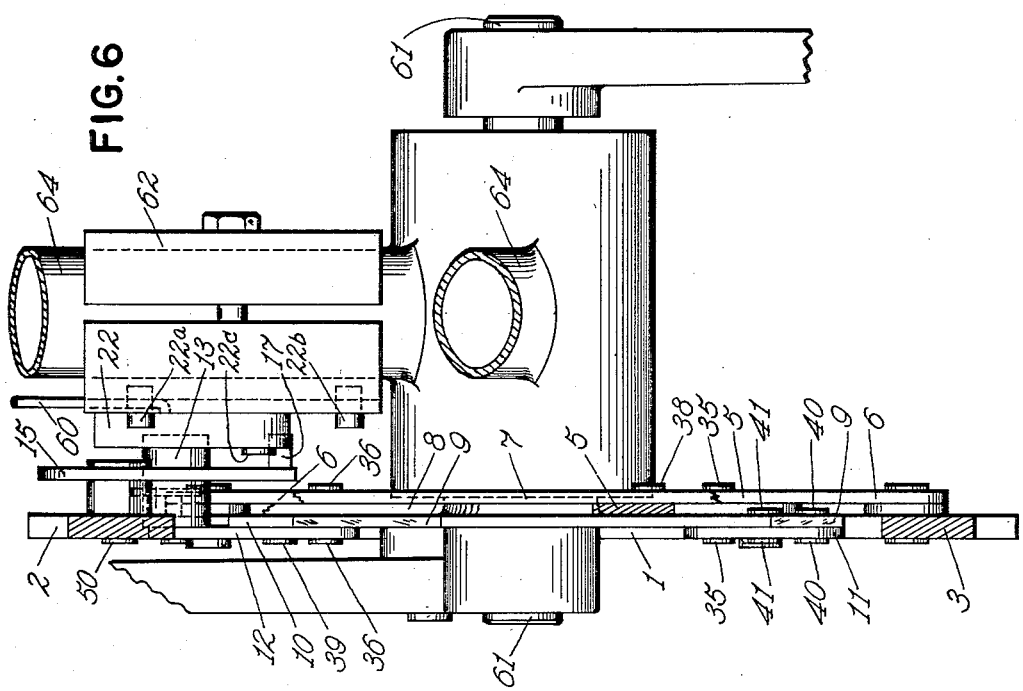
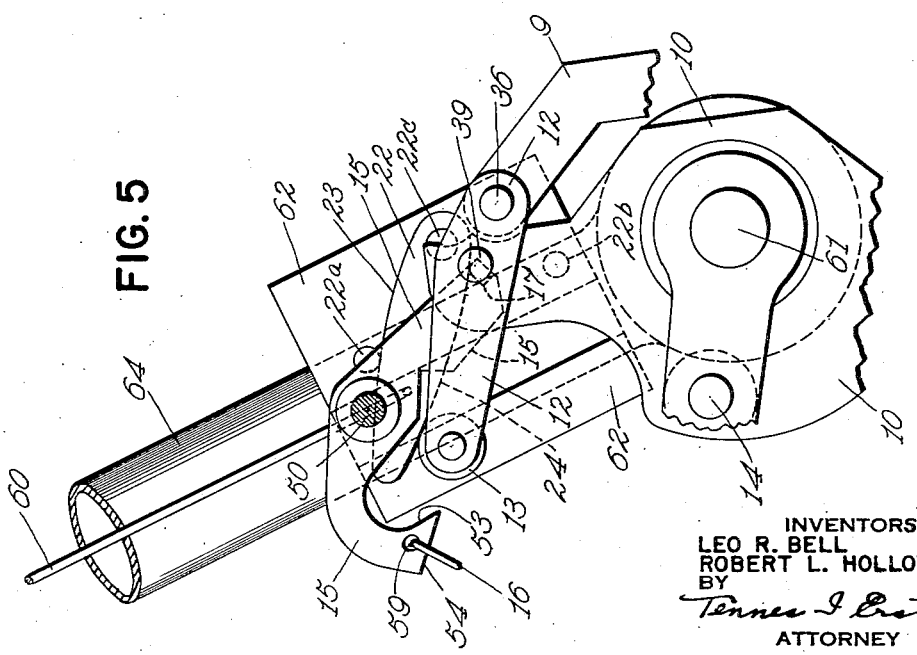
INVENTORS
LEO R. BELL
ROBERT L. HOLLOWAY
BY
*Tennes I. Erstad*
ATTORNEY United States Patent Office 2,827,797
Patented Mar. 25, 1958

2,827,797

BICYCLE DRIVE

Leo R. Bell and Robert L. Holloway, Snyder, N. Y., assignors to American Machine & Foundry Company, a corporation of New Jersey Application July 22, 1954, Serial No. 444,962

10 Claims. (Cl. 74—325)

This invention relates to improvements in driving sprockets and particularly in bicycle drives employing sprockets and sprocket chains.

In various fields and particularly in the bicycle art it has been found that elliptical bicycle driving sprockets have had certain advantages as well as disadvantages. For example, in going up a hill or pedaling against a strong wind it is desirable to give a pedaler more leverage on the down stroke than on the horizontal movement of his feet, and this can be advantageously arranged by means of an elliptical sprocket. However, as soon as the rider does not require this additional leverage as would occur where he begins pedaling along horizontal ground or where he no longer is bucking a wind, then a circular driving sprocket is preferable to an elliptical driving sprocket.

As a consequence there was a dilemma. If a bicycle were manufactured to give a rider the advantages of an elliptical sprocket he would also have the disadvantages mentioned above. Since it has been found that a bicycle rider does not spend the largest percentage of his riding time going up hill or against winds, most bicycles manufactured today are equipped with circular sprockets.

In some cases the bicycle rider is given a lower gear ratio by means of a multiple speed transmission which is of great assistance to him in contending with head winds and hills. The disadvantage of this, however, is that it does not take into consideration that in certain portions of the pedaling cycle the rider is capable of more readily exerting a greater degree of force, as on the down stroke, than he is when moving the pedal forward. As a consequence it is desirable to have some means which can give the rider this variable mechanical advantage in addition to the variation in the gear ratio.

It is therefore an object of this invention to provide a drive for a bicycle which will take into account the human limitations in operating a pedaling device so as to allow the individual to exert the greatest amount of leverage at a point where he is in a position to make such an exertion and to decrease the effort required when this is least possible.

Another object of this invention is to provide the rider with the advantages of an elliptical drive sprocket and also with the advantages of a circular drive sprocket at the will of the rider.

Another object of this invention is to provide a bicycle driving sprocket that can be quickly changed from a round to an elliptical driving sprocket.

Other objects and features of the invention will appear as the description of the particular physical embodiment selected to illustrate the invention progresses. In the accompanying drawings, which form a part of this specification, like characters of reference have been applied to corresponding parts through the several views which make up the drawings.

Fig. 2 is a side elevation of the combined round and elliptical bicycle drive sprocket illustrating the same when used as an elliptical sprocket.

Fig. 3 is an end elevation, partly in section, of one end of the sprocket linkage pivot assembly, taken on line 3—3 of Fig. 2.

Fig. 4 is also an end elevation, partly in section, of the sprocket linkage actuating means, taken on line 4—4 of Fig. 2.

Fig. 5 is a side elevation illustrating the sprocket linkage locking and control mechanism.

Fig. 6 is a sectional end elevation of the combined round and elliptical sprocket, taken on line 6—6 of Fig. 1.

Figure 1:
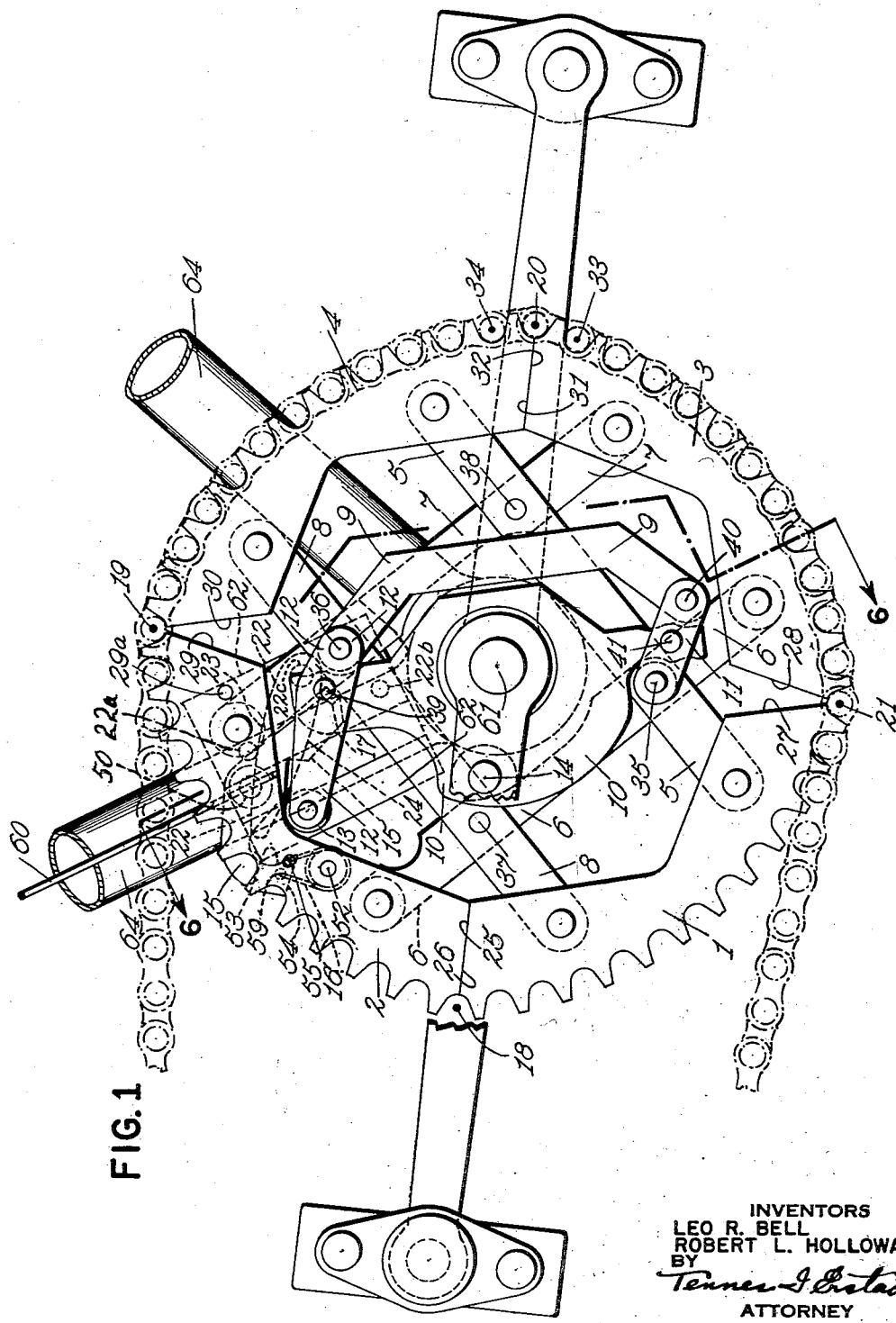
Fig. 1 is a side elevation of the combined round and elliptical bicycle drive sprocket illustrating the same when used as a round sprocket.

In the embodiment employed to illustrate the invention I have shown a bicycle driving sprocket which consists of four (4) segments, numbered 1, 2, 3, and 4 in Figs. 1 and 2. These segments are so mounted that they can be formed into either an elliptical configuration or into an essentially circular configuration at the will of the rider. The important factor to bear in mind is that regardless of the number of segments employed to make the oval or elliptical configuration, the chains lie on the sprocket properly at all times regardless of whether the sprocket has an oval configuration or a circular configuration.

In the embodiment of the invention I have employed a lazy tong type of structure for changing the configuration of the segments from a circular configuration to an oval or elliptical configuration. This structure consists of links 5, 6, 7, and 8 which are pinned together by rivets 35, 36, 37, and 38 forming a parallelogram scissors linkage or lazy tong type of structure. In addition, the sprocket segments 1, 2, 3, and 4 are pivotally connected to the ends of the parallelogram links and form together with the links four (4) additional parallelogram linkages.

This construction allows segments 1, 2, 3, and 4 to pivot about each other at points 18, 19, 20, and 21. These points are on the mutual sprocket segment pitch circles and exactly one pitch distance from the adjacent tooth gap on each sprocket section, as illustrated by point 20 and adjacent points 33 and 34.

The riveted parallelogram link and sprocket segment assembly is carried by links 11 and 12 through pivot pins 35 and 36.

Links 11 and 12 are in turn carried by plate 10 through pivot pins 41 and 39. Links 11 and 12 are forced to remain parallel to each other by tie link 9 which is attached to links 11 and 12 by pivot pins 40 and 36.

Plate 10 is supported by the crank shaft 61 and is secured to the pedal crank by a pin 14. As the pedal crank is rotated, the sprocket is shifted from round to elliptical configuration when the cable 60 attached to cam 22 is pulled upwardly to bring the surface 24 of cam 22 in the path of roller 13.

When cable 60 is pushed downwardly the surface 23 of cam 22 moves into the path of roller 13, and causes the sprocket to assume its original round configuration. A pair of stop pins 22a and 22b are provided to check the upper and lower position of cam 22. The latter is pivotally supported by means of a stop 22c held by a suitable block 62 mounted on the tubular frame 64.

If the sprocket is in the round configuration and the cam 22 is at its inner position, as shown in Fig. 2 nothing will happen, since cam roller 13 just clears over the outermost portion of the surface 23 on cam 22. When the cam is shifted to the upper position, as shown in Fig. 1, then the cam roller will strike against surface 24 on cam 22 and the sprocket will be shifted to the elliptical configuration through the action of the cam roller 13 on links 9, 11, and 12. As the sprocket continues to rotate, cam roller 13 will just clear the lower portion of surface 24 on cam 22.

To shift back to the round configuration, cam 22 is shifted to its lower position as shown in Fig. 2. Cam roller 13 will then be engaged by cam surface 23 on cam 22 and the sprocket will be shifted back to its round configuration.

Stops for elliptical configuration are provided by surfaces 27 and 28 of segments 1 and 3, and surfaces 29 and 30 of segments 2 and 4 which butt against each other. Similarly, surfaces 25 and 26 on segments 1 and 2 and surfaces 31 and 32 on segments 3 and 4 form stops for the round configuration.

It should be noted that with the parallelogram construction used points 35 and 36 will always lie on a line passing through the center of the pedal crank shaft. Also, points 18 and 20 will always lie on a line passing through the center as will points 19 and 21. Thus the center symmetry of the sprocket in both its round and elliptical shapes will always lie on the center of the crank shaft 61.

It has been found that this sprocket structure is always stable in its elliptical configuration. In order to prevent the sprocket from shifting automatically to the elliptical configuration a latch has been provided for positively maintaining the sprocket in its round configuration.

This latch structure is shown in Fig. 5. The latch piece 15 pivots around the pivot 50 and is held in its position by torsion spring 16 which is mounted on pivot 52 in sprocket segment 2. A tab or hook 59 of spring 16 is inserted in a hole in latch 15. The other end of spring 16 has a tab or hook 55 which is held in a hole formed in segment 2.

When the sprocket is in the elliptical configuration a stop 29a holds the latch in the position as shown in Fig. 2. When the sprocket is shifted to its round configuration the cam roller 13 acts against the surface 54 of latch 15 and moves the latch outwardly around its pivot 50 until the hook portion 53 of the latch catches and holds cam roller 13. When shifting to elliptical configurations tab or hook 17 of latch 15 engages surface 24 of cam 22 thus releasing roller 13 as shown in Fig. 1.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A drive for a bicycle comprising a shaft rotatably mounted in a bicycle frame, an extendable and contractable linkage connected to said shaft for rotation thereby, sprocket segments connected to said linkage so that said segments will form a sprocket with a substantially round configuration when said linkage is in contracted position and an elliptical configuration when said linkage is in an extended position, and means for maintaining said link-structure in either extended or contracted position at the will of a rider.

2. A drive for a bicycle comprising a shaft mounted in the frame of the bicycle, a bicycle drive sprocket, means for converting said bicycle drive sprocket from a round to an elliptical configuration, a sprocket chain connecting said sprocket with a second sprocket for driving the wheels of a bicycle, a stop coacting with said means for maintaining said drive sprocket in either a round or an elliptical configuration.

3. A drive as in claim 2 wherein the stop coacting with the means for converting the bicycle drive sprocket is manually controlled.

4. A drive for a bicycle comprising a shaft rotatably mounted in the frame of a bicycle, a bicycle driving sprocket made of a plurality of segments, a linkage structure interconnecting said segments with said driving shaft to rotate said segments in an endless path, means for maintaining said segments in a circular configuration, and a second means for maintaining said segments in an elliptical configuration.

5. A drive for a bicycle comprising a shaft, a sprocket having an adjustable configuration connected to said shaft for rotation thereby, a device for making said sprocket into a circular configuration, means for rendering said sprocket elliptical, and locking means for maintaining said sprocket in either a circular or an elliptical configuration.

6. A bicycle drive sprocket comprising a plurality of segments, linkage interconnecting said segments, said linkage being expandable and contractable for changing said segments from a circular configuration to an elliptical configuration, a lock for maintaining said sprocket segments in one of said configurations, and means actuated by the rider for releasing said lock to allow the sprocket to assume the other of said configurations.

7. A pedal operated bicycle drive comprising a shaft, a segmented driving sprocket, a lazy tong linkage interconnecting said segmented driving sprockets with the shaft on which said pedals are mounted, means for actuating said lazy tong linkage for arranging said sprocket segments in a circular configuration and a second means for actuating said lazy tongs to rearrange said segments into an elliptical configuration.

8. A bicycle having a drive comprising a shaft mounted in the frame of the bicycle, a pair of pedal arms extending in opposite directions from opposite ends of said shaft, a linkage structure rotated by said shaft and pedal arms, sprocket segments mounted on said linkage structure means interconnecting the ends of said linkage structure with said sprocket segments, and means for locking said linkage structure in one position to maintain said segments in a circular configuration and for locking said segments in another position for maintaining said segments in an elliptical configuration, and control means for causing said first named means to maintain said segments in either a circular or an elliptical configuration.

9. A drive comprising sprocket segments, means pivotally joining said segments to each other, a drive shaft, extendible and contractible linkage interconnecting said drive shaft with said sprocket segments, means for extending said linkage to impart an elongated configuration to said pivotally joined sprocket segments and for contracting said linkage to impart a substantially circular configuration to said sprocket segments and means for locking said linkage in either expanded or contracted position.

10. A variable drive sprocket comprising flexibly joined sprocket segments, a rotatable shaft, linkage controlling the configuration of said sprocket and joining said segments to said shaft, and means for locking said linkage against relative movement each time said sprocket has been moved into the configuration desired.

References Cited in the file of this patent

UNITED STATES PATENTS

| | | |
|---|---|---|
| 885,982 | Delacroix | Apr. 28, 1908 |
| 2,693,119 | Payberg | Nov. 2, 1954 |